United States Patent Office 3,287,390
Patented Nov. 22, 1966

3,287,390
2,2,4,4-TETRAMETHYLCYCLOBUTYL
COMPOUNDS
George I. Poos, Ambler, and John T. Suh, Flourtown,
Pa., assignors to McNeil Laboratories, Incorporated, a
corporation of Pennsylvania
No Drawing. Filed Aug. 21, 1961, Ser. No. 132,541
9 Claims. (Cl. 260—456)

This invention relates to a new series of organic compounds. More particularly, the invention concerns compounds of the general formula

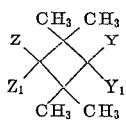

wherein Z and Y are each benzenesulfonamido; and wherein Z and Y represent different substituents selected from the group consisting of hydroxy, amino, dialkylamino, —OCOX wherein X is aralkyl, aryl, —NHCN, benziloyloxy, diphenylacetoxy, —NHCONH$_2$,

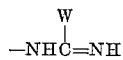

wherein W is halogen or lower alkoxy, the latter being, for example, methoxy, ethoxy, propoxy, butoxy, isobutoxy, etc., and p-tolylsulfonyloxy, provided that, when one of said Z and Y is hydroxy, the other is other than amino and dialkylamino; and wherein $Z_1$ and $Y_1$ are selected from the group consisting of hydrogen and, when Z is aryl, $Z_1$ is hydroxy, and when Y is aryl, $Y_1$ is hydroxy; and wherein Z and $Z_1$ taken together represent a member selected from the group consisting of oxo and =NOH in which case Y is other than said hydroxy, amino and dialkylamino.

Alkyl substituents in the above general formula are lower alkyl groups from 1 to 7 carbon atoms such as methyl, ethyl, propyl, isopropyl, butyl, isobutyl, pentyl, isopentyl, pentyl, hexyl, isohexyl, and heptyl. The aralkyl moiety in the acyloxy substituents in the above general formula is benzyl, α-phenethyl, β-phenethyl, phenylpropyl, phenylbutyl, tolylmethyl and naphthylethyl. Aryl groups include mononuclear aryl substituents such as phenyl, tolyl and xylyl, including the substituted aryl wherein the substituents are halo radicals, for example chloro, fluoro or iodo; alkyl, including lower alkyl, such as methyl, ethyl, propyl, butyl, isopropyl, isobutyl, pentyl, isopentyl; and lower alkoxy wherein the alkyl radical attached to the oxygen is one of those given above.

The compounds of this invention may be converted to their therapeutically useful acid addition salts by reaction with an appropriate acid, as for example an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxybenzoic or 2-acetoxybenzoic acid.

The novel compounds may be converted into the corresponding quaternary ammonium compounds by reaction of the tertiary bases with alkylating agents, i.e. alkyl or aralkyl halides or esters formed by reacting alkanols with an oxygen-containing acid such as methyl iodide, ethyl bromide, propyl chloride; lower alkenyl halides—allyl bromide; di-lower alkyl sulfates—dimethylsulfate, diethylsulfate; lower alkyl arylsulfonates—methyl p-toluolsulfonate or aralkyl halides—benzyl chloride. The quaternizing reaction may be performed in the presence or absence of a solvent, at room temperature or under cooling, at atmospheric pressure or in ethers such as diethylether and tetrahydrofuran, hydrocarbons such as benzene and heptane, ketones such as acetone and butanone, lower alkanols such as ethanol, propanol or butanol; or organic acid amides such as formamide or dimethylformamide. When lower alkyl halogenides are used as quaternizing agents, diethylether and benzene are the preferred solvents.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchange or by electrodialysis. Quaternary ammonium salts may be prepared from the resulting base by reaction with acids such as those mentioned hereinabove for the preparation of the acid addition salts or, if desired, with a mono lower alkyl sulfate such as methylsulfate or ethylsulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

A variety of methods may be used to obtain the compounds of the invention depending upon the nature of the end product observed. The 3-hydroxy - 2,2,4,4 - tetramethylcyclobutanone starting material may be converted to the oxime by reaction with hydroxylamine with or without a basic catalyst in a suitable solvent either at ambient temperature or under reflux conditions. Suitable basic catalysts include tertiary bases, such as quinoline, triethylamine, dimethylaniline, trimethylamine and, preferably, pyridine or alkali metal salts of fatty acids, such as acetic acid, e.g. sodium acetate or alkali metal or alkaline earth metal hydroxides, carbonates, bicarbonates, e.g. potassium carbonate or weakly basic ionexchange resins. As solvents, the lower alkanols are preferred, such as methanol, ethanol, butanol and 2-propanol, other suitable solvents include ethers, such as dioxane and tetrahydrofuran, hydrocarbons, such as benzene and toluene, esters, such as ethyl acetate or tertiary basis, such as pyridine.

The dibenzenesulfonamide derivatives of the compounds of the present invention may be prepared by reacting the 1,3-diamine starting material, preferably in the form of a water soluble acid addition salt, with a benzene sulfonyl halide, such as the chloride in the presence of a basic condensing agent such as an alkali or alkaline earth metal hydroxide, e.g. sodium hydroxide or potassium hydroxide.

Those compounds of the novel series having an alcohol and an amino substituent in the 1,3-positions are prepared by reduction of 3-hydroxy-2,2,4,4-tetramethylcyclobutanone oxime with an alkali metal and a lower alkanol, e.g. sodium in the presence of methanol, ethanol, propanol or preferably n-butanol. Alternatively, this reduction is carried out with a hydrogenating agent, e.g. hydrogen catalytically activated by a platinum, palladium, nickel, rhodium or ruthenium catalyst in the presence of a suitable organic solvent, such as a lower alkanol, e.g. methanol, ethanol or an ester, such as ethyl acetate, etc.

Introduction of the acyl moiety into the cyclic nucleus is accomplished by acylation of the hydroxy-substituted 2,2,4,4-tetramethylcyclobutanone starting material in the presence of a suitable acylating agent, e.g. p-toluenesulfonyl chloride, preferably at reduced temperatures from about 0° C. to about −10° C.

Chromic acid oxidation in the presence of a tertiary amine base of 3-substituted-2,2,4,4-tetramethyl-1-cyclobutanol gives the corresponding butanone which can, if desired, be converted to the corresponding amine hydrochloride by reaction with the appropriate acid, e.g. hydrogen chloride.

Alkylation of 3-amino-2,2,4,4-tetramethyl-1-cyclobutanol is accomplished by allowing it to react with an aldehyde or ketone and formic acid or formamide, e.g. formaldehyde solution and formic acid, preferably at an elevated temperature. The alkylation can also be carried out by catalytic hydrogenation of a mixture of an aldehyde or ketone with amine, e.g. hydrogen catalytically activated by a platinum, palladium or nickel catalyst. The alkamines are also prepared by reaction with suitable alkylating agents, e.g. an alkyl halide, alkyl nitrate or alkyl sulfate.

The aryl moiety is introduced into the cyclic ketone by allowing it to react with suitable organometallic compounds, e.g. phenyllithium or phenylmagnesium halide in a suitable organic solvent, e.g. ether or tetrahydrofuran.

Esterification of the aminoalcohol is achieved either by refluxing it with a suitable acid anhydride, e.g. diphenylacetic anhydride, in a suitable inert organic solvent, e.g. benzene, or by the transesterification of an ester, e.g. ethyl benzilate, with aminoalcohol. This reaction can be accomplished in the appropriate inert organic solvent, e.g. heptane, with a suitable base catalyst, e.g. sodium or potassium alkoxide, sodium amide or basic ion-exchange resin, preferably at elevated temperature to remove any azeotrope formed.

The cyanamide is prepared by the reaction of aminoalcohols with cyanogen bromide in a suitable organic solvent, e.g. methanol, in the presence of an alkali metal salt of a fatty acid such as acetic acid, e.g. sodium acetate at a low temperature.

Cyclobutylurea is prepared by allowing the corresponding cynamide to react with an inorganic base, e.g. sodium or potassium hydroxide solution in water at a low temperature.

The perparation of cyclobutylchloroformamidine is accomplished by allowing the corresponding cyanamide to react with a suitable acid, e.g. hydrogen chloride in an inert organic solvent, e.g. tetrahydrofuran at a low temperature.

Depending upon the reaction conditions or starting materials employed, the substituents in the 1- and 3-positions may be either in the "cis" or "trans" configuration in 3-dimensional representations. It is to be understood therefore, that the novel compounds, as generically described and claimed, are intended to embrace both configurations, it being well within the purview of one skilled in the art to determine which configuration is desired by initiating the process with the appropriate starting material. The examples given below are therefore to be understood as illustrations of discrete species, not as limitations upon the scope of the invention or as restrictive exemplifications of "cis" or "trans" configurations of a given compound.

The compounds of this invention are useful as hypotensive agents. They may be used in the form of pharmaceutical preparations which contain the compounds, salts or quaternary ammonium compounds thereof in admixture with a pharmaceutical organic or inorganic solid or liquid carrier suitable for oral or parenteral administration. For formulating the preparations one may employ substances which do not react with the new compounds, such as water, gelatin, lactose, starches, magnesium stearate, talc, vegetable oils, gums, polyalkylene glycols, etc. The pharmaceutical preparations may be in the form of tablets, pills, capsules or in liquid form such as solutions, suspensions or emulsions. If desired, the novel compound may be formulated with other therapeutically active substances.

The following examples are intended to illustrate but not to limit the scope of the present invention.

*Example I*

A mixture of 20 parts by weight of tetramethylcyclobutane-1,3-dione, 2 parts by volume of triethylamine, and 1½ teaspoonsful of nickel catalyst in 250 parts by volume of absolute ethyl alcohol is placed in the low pressure hydrogenation apparatus. The bottle is alternately evacuated and filled with hydrogen twice, and the mixture is then shaken with hydrogen. The reduction is rapid and within seventy minutes the theoretical amount of hydrogen is taken up. The mixture is filtered and the bottle is rinsed with 50 parts by volume of ethyl alcohol. The combined solution is distilled under diminished pressure to remove the solvent, and there is obtained 20 parts by weight of crude product. After one recrystallization from distilled water, 19 parts by weight of 3-hydroxy-2,2,4,4-tetramethylcyclobutanone, melting point 112–114° C. (sealed capillary tube) is obtained.

*Example II*

A mixture of 11.5 parts by weight of 3-hydroxy-2,2,4,4-tetramethylcyclobutanone, 7 parts by weight of hydroxylamine hydrochloride, and 10 parts by volume of pyridine in 100 parts by volume of 95% alcohol is allowed to reflux for four hours. To the cooled solution is added 100 parts by volume of distilled water and the solution is allowed to stand at room temperature for a few hours. No crystalline product is formed from the solution. The solvent is distilled under diminished pressure, and the residue is recrystallized from ethyl acetate-petroleum ether. After three recrystallizations from ethyl acetate-petroleum ether, 5 parts by weight of 3-hydroxy-2,2,4,4-tetramethylcyclobutanone oxime, melting point 146–150° C., is obtained.

*Example III*

To a solution of 15.3 parts by weight of 3-hydroxy-2,2,4,4-tetramethylcyclobutanone in 135 parts by volume of 50% ethyl alcohol are added 9.2 parts by weight of hydroxylamine hydrochloride and a solution of 10.7 parts by weight of sodium acetate in 35 parts by volume of distilled water. The solution is heated on a steam bath for five minutes and then it is stirred at room temperature for twelve hours. To the solution is added 100 parts by volume of distilled water, and it is stirred at room temperature overnight. The formed product is separated and recrystallized from ethyl acetate-petroleum ether to give 13.5 parts by weight of 3-hydroxy-2,2,4,4-tetramethylcyclobutanone oxime, melting point 147–152° C. A mixed melting point with the compound prepared according to the procedure of Example II shows no depression.

*Example IV*

To a mixture of 16 parts by weight of tetramethylcyclobutane-1,3-dione dioxime and 1.1 parts by weight of platinum oxide in 120 parts by volume of absolute methanol is added 80 parts by volume of absolute methanol containing 10.95 parts by weight of anhydrous hydrogen chloride gas, and the mixture is placed in a low pressure hydrogenation apparatus. The bottle is alternately evacuated and filled with hydrogen twice, and the mixture is shaken with hydrogen. Hydrogen is taken up during a six-hour period and the reduction stops. After removing the catalyst the solvent is distilled under diminished pressure, and the residue is recrystallized from methanol-ether to obtain 3.9 parts by weight of tetramethylcyclobutane-1,3-diamine dihydrochloride, melting point 303–307° C. (dec.).

*Example V*

A 0.4 part by weight of 2,2,4,4-tetramethylcyclobutane-1,3-diamine dihydrochloride and 1 part by volume of benzenesulfonyl chloride are added into 25 parts by volume of 5% sodium hydroxide solution. The mixture is shaken for one hour until the sulfonyl chloride is consumed. The product is separated and recrystallized from ethyl alcohol to give 0.42 parts by weight of 1,3-dibenzenesulfonamido - 2,2,4,4 - tetramethylcyclobutane, melting point 268–270° C.

*Example VI*

To a boiling solution of 20 parts by weight of 3-hydroxy - 2,2,4,4 - tetramethylcyclobutanone oxime in 400 parts by volume of anhydrous n-butyl alcohol (distilled over calcium hydride) is added, with constant stirring, 50 parts by weight of sodium. The addition of sodium requires about ten minutes. The mixture is allowed to reflux for an hour and is cooled. To the mixture is added 200 parts by volume of distilled water. After saturating with sodium chloride the basic mixture is acidified with dilute hydrochloric acid, and the n-butyl alcohol layer and the aqueous layer are separated.

The n-butyl alcohol layer is dried over anhydrous magnesium sulfate, the solvent is distilled under diminished pressure, and the residue is dissolved in 150 parts by volume of distilled water. The resulting solution is made basic with sodium hydroxide solution, is saturated with sodium chloride, and is extracted with 150 parts by volume portions of dichloromethane several times. The combined solution is dried over anhydrous magnesium sulfate and is distilled under diminished pressure. The oily residue is dissolved in anhydrous ether and the amine is converted to the corresponding hydrochloride. After one recrystallization from absolute alcohol-ether, 10 parts by weight of trans - 3 - amino - 2,2,4,4 - tetramethyl-1-cyclobutanol hydrochloride, melting point 242–244.5° C. (dec.), is obtained.

The original aqueous layer is made strongly alkaline and is extracted with dichloromethane several times. The combined solution is dried over anhydrous magnesium sulfate and is distilled under diminished pressure. The oily residue is dissolved in anhydrous ether and the amine is converted to the corresponding hydrochloride. After one recrystallization from aboslute alcohol-ether, 3.5 parts by weight of additional product, melting point 242–244.5° C. (dec.), is obtained. The total 13.5 parts by weight of trans - 3 - amino - 2,2,4,4 - tetramethyl - 1-cyclobutanol hydrochloride, melting point 242–244.5° C. (dec.), is obtained.

*Example VII*

A solution of 6.1 parts by weight of trans-3-amino-2,2,4,4-tetramethyl-1-cyclobutanol hydrochloride in 50 parts by volume of distilled water is carefully neutralized with 2 parts by weight of sodium hydroxide in 20 parts by volume of distilled water. The free amine is extracted with three 50 parts by volume portions of dichloromethane, the combined solution is dried over anhydrous magnesium sulfate, and the solvent is distilled under diminished pressure. An 8.7 parts by weight of cold 88% formic acid is added to the amine residue and to the resulting clear solution is added 8.2 parts by weight of 37% formaldehyde solution. The mixture is placed in an oil bath which has been heated to 100° C. A vigorous evolution of carbon dioxide begins after two to three minutes, at which time the reaction mixture is removed from the bath until the gas evolution notably subsides; then it is returned to the bath and heated to 100–120° C. for ten hours. After the mixture is cooled, 30 parts by volume of 2 N hydrochloric acid is added and the acidic solution is distilled under diminished pressure to remove the solvent. The pale yellow syrupy residue is dissolved in 20 parts by volume of distilled water and the organic base is liberated by the addtion of 40 parts by volume of 3 N sodium hydroxide solution. The upper organic phase is extracted with two 75 parts by volume portions of ether and five 75 parts by volume portions of dichloromethane.

The combined solution is dried over anhydrous magnesium sulfate; the solvent is distilled under diminished pressure. The amine residue is dissolved in 100 parts by volume of anhydrous ether and is converted to the corresponding amine hydrochloride.

After one recrystallization from alcohol-ether, 5.2 parts by weight of trans-3-dimethylamino-2,2,4,4-tetramethyl-1-cyclobutanol hydrochloride, melting point 274–275.5° C. (dec.) (sealed capillary tube), is obtained.

*Example VIII*

A 12.8 parts by weight of 3-hydroxy-2,2,4,4-tetramethylcyclobutanone is dissolved in 100 parts by volume of pyridine and the solution is cooled to −5° C. in an ice-salt bath. To the solution is added 20 parts by weight of p-toluenesulfonyl chloride and the suspension is gently swirled with cooling until the p-toluenesulfonyl chloride has dissolved. The reaction mixture is then allowed to react at −5° C. for twenty-four hours. To the reaction mixture is added 10 parts by volume of cold distilled water in portions with cooling so that the temperature does not rise above −5° C. The mixture is then diluted with 100 parts by volume of distilled water and the product is filtered and washed with distilled water. After one recrystallization from ethanol, 11 parts by weight of 3-hydroxy-2,2,4,4-tetramethylcyclobutanone p-toluenesulfonate, melting point 125–126° C., is obtained.

*Example IX*

A solution of 3.5 parts by weight of trans-3-dimethylamino-2,2,4,4-tetramethyl-1-cyclobutanol hydrochloride in 50 parts by volume of distilled water is carefully made basic with 2 parts by weight of sodium hydroxide in 20 parts by volume of distilled water. The free amine is extracted with five 50 parts by weight portions of dichloromethane, the combined solution is dried over anhydrous magnesium sulfate, and the solvent is distilled under diminished pressure. The free amine and 9.7 parts by weight of diphenylacetic anhydride are dissolved in 60 parts by volume of benzene, and the solution is allowed to reflux for seventy-two hours.

Benzene is distilled under diminished pressure, the residue is dissolved in 150 parts by volume of anhydrous ether, and then it is converted to the corresponding amine hydrochloride. After one recrystallization from absolute methanol-ether, 5.5 parts by weight of trans-3-dimethylamino-2,2,4,4-tetramethyl-1-cyclobutyldiphenylacetate hydrochloride, melting point 229–231° C. (sealed capillary), is obtained.

*Example X*

A mixture of 10 parts by weight of 3-hydroxy-2,2,4,4-tetramethylcyclobutanone oxime and 2 teaspoonsful of nickel catalyst in 100 parts by volume of absolute ethanol is placed in the low pressure hydrogenation apparatus. The bottle is alternately evacuated and filled with hydrogen twice, and the mixture is then shaken with hydrogen (50 to 60 lbs. p.s.i.). The reduction is very rapid and within twenty minutes the theoretical amount of hydrogen is taken up. The mixture is filtered and the solvent is distilled under diminished pressure to obtain 10 parts by weight (theoretical yield) of crude product.

Five parts by weight of the free base in anhydrous ether is converted to the corresponding amine hydrochloride by treating the solution with anhydrous hydrogen chloride. After one recrystallization from ethanol-ether, 4.5 parts by weight of cis-3-amino-2,2,4,4-tetramethyl-1-cyclobutanol hydrochloride, melting point 243–245° C. (dec.) (sealed capillary tube), is obtained.

*Example XI*

Thirty-seven parts by weight of cold 88% formic acid is added to 20 parts by weight of cis-3-amino-2,2,4,4-tetramethyl-1-cyclobutanol and to the resulting clear solution is added 34 parts by weight of 37% formaldehyde solution. The mixture is placed in an oil bath which has been heated to 100° C. A vigorous evolution of carbon dioxide begins after three to five minutes, at which time the reaction mixture is removed from the bath until the gas evolution notably subsides; then it is returned to the bath and heated at 100° C. for eighteen hours. After the mixture is cooled, a dilute hydrochloric acid solution (30 parts by volume of concentrated hydrochloric acid in 70 parts by volume of distilled water) is added and the acidic resolution is distilled under diminished pressure to remove the solvent. The resulting syrupy residue is dissolved in 80 parts by volume of distilled water and the organic base is liberated by the addition of a solution of 30 parts by weight of sodium hydroxide in 100 parts by volume of distilled water. The upper organic phase is extracted with three 150 parts by volume portions of ether and three 150 parts by volume portions of methylene chloride.

The combined solution is dried over anhydrous magnesium sulfate and the solvent is distilled under diminished pressure to obtain 18 parts by weight of cis-3-dimethylamino-2,2,4,4-tetramethyl-1-cyclobutanol, melting point 115–118° C.

A 6.6 parts by weight of the free base in anhydrous ether is converted to the corresponding amine hydrochloride by treating the solution with anhydrous hydrogen chloride. After one recrystallization from ethanol-ether, 6.3 parts by weight of cis-3-dimethylamino-2,2,4,4-tetramethyl-1-cyclobutanol hydrochloride, melting point 292–293° C. (dec.) (sealed capillary tube), is obtained.

*Example XII*

Pyridine, 100 parts by volume, is cooled in an ice bath and 10 parts by weight of chromic acid is added in portions with thorough mixing. To the resulting complex is added with stirring a solution of 10 parts by weight of cis-3 - dimethylamino - 2,2,4,4-tetramethyl-1-cyclobutanol in 100 parts by volume of pyridine. The resulting dark mixture is allowed to stand at room temperature for sixty hours and then is treated with 200 parts by volume of ice water. This mixture is extracted six times with ether, washing each ether extract with a small portion of water, which is added to the pyridine-water reaction mixture. The combined etheral extracts are dried over anhydrous magnesium sulfate and concentrated to dryness under diminished pressure, finally with pumping under high vacuum, to give 7 parts by weight of crude 3-dimethylamino-2,2,4,4-tetramethyl-1-cyclobutanone as a light yellow oil.

One part by weight of 3-dimethylamino-2,2,4,4-tetramethyl-1-cyclobutanone in anhydrous ether is converted to the corresponding amine hydrochloride by treating the solution with anhydrous hydrogen chloride. After one recrystallization from ethanol-ether, 1.2 parts by weight of 3-dimethylamino-2,2,4,4 - tetramethyl-1-cyclobutanone hydrochloride, melting point 223–225.5° C. (dec.) (sealed capillary tube), is obtained.

A solution of 3.82 parts by weight of the free amine in 50 parts by volume of isopropyl alcohol is added to a solution of 2.62 parts by weight of fumaric acid in 100 parts by volume of isopropyl alcohol. After one recrystallization from ethanol-ether, 4.9 parts by weight of 3-dimethylamino - 2,2,4,4 - tetramethyl-1-cyclobutanone fumarate, melting point 140–143° C., is obtained.

*Example XIII*

To a solution of 5 parts by weight of cis-3-amino-2,2,4,4-tetramethyl-1-cyclobutanol and 3.1 parts by weight of sodium acetate in 50 parts by volume of 95% methanol is added with cooling a solution of 3.9 parts by weight of cyanogen bromide in 25 parts by volume of methanol. The resulting solution is allowed to stand at room temperature for ninety minutes and the solvent is distilled under diminished pressure. A 75 parts by volume portion of water is added to the residue; the resulting white solid is filtered and recrystallized from benzene to give 3 parts by weight of cis-3-hydroxy-2,2,4,4-tetramethyl-1-cyclobutylcyanamide, melting point 164–166° C. (sealed capillary tube).

*Example XIV*

A solution of phenyllithium is prepared by adding in portions under nitrogen 1.1 parts by weight of lithium wire to a solution of 11.8 parts by weight of bromobenzene in 100 parts by volume of anhydrous ether. The mixture is stirred with a Hershberg stirrer until the reaction is complete. A solution of 7.7 parts by weight of 3-dimethylamino-2,2,4,4-tetramethyl-1-cyclobutanone in 100 parts by volume of anhydrous ether is added at a rate to maintain reflux (10 minutes) to the phenyllithium solution. The resulting mixture is stirred at room temperature overnight and hydrolyzed by adding 30 parts by volume of water dropwise. When all of the solid has dissolved, the layers are separated and the aqueous part is extracted with ether. The combined etheral solution is dried over anhydrous magnesium sulfate and concentrated to dryness under diminished pressure, finally with pumping under high vacuum, to give 9.0 parts by weight of crude 3-dimethylamino - 1-phenyl-2,2,4,4-tetramethyl-1-cyclobutanol as a light brown oil.

Nine parts by weight of the organic base in anhydrous ether is converted to the corresponding amine hydrochloride by treating the solution with anhydrous hydrogen chloride. After two recrystallizations from ethanol-ether, 4.5 parts by weight of 3-dimethylamino-2,2,4,4-tetramethyl-1-phenyl-1-cyclobutanol hydrochloride, melting point 267–269° C. (dec.) (sealed capillary tube), is obtained.

*Example XV*

A mixture of 3.8 parts by weight of cis-3-amino-2,2,4,4-tetramethyl-1-cyclobutanol and 9.5 parts by weight of diphenylacetic anhydride in 50 parts by volume of anhydrous benzene is allowed to reflux for twenty-four hours. The reaction mixture is diluted with 50 parts by volume of anhydrous ether and the amino-ester is converted to the corresponding amine hydrochloride by treating the solution with anhydrous hydrogen chloride. After one recrystallization from benzene-ether, 8.0 parts by weight of cis - 3-dimethylamino-2,2,4,4-tetramethyl-1-cyclobutyldiphenylacetate hydrochloride, melting point 221° C. (sealed capillary tube), is obtained.

*Example XVI*

To a solution of 5 parts by weight of cis-2-dimethylamino-2,2,4,4-tetramethyl-1-cyclobutanol in 100 parts by volume of anhydrous ether is added 11 parts by weight of methyl iodide and the mixture is allowed to react at room temperature for five hours. The solvent is distilled under diminished pressure and the residue is recrystallized from methylene chloride-ether to obtain 4.1 parts by weight of cis-3-hydroxy-2,2,4,4-tetramethyl-1-cyclobutyltrimethylammonium iodide, melting point 218–221° C. (sealed capillary tube).

*Example XVII*

Dry sodium methoxide is prepared by dissolving 0.8 parts by weight of sodium in 50 parts by volume of anhydrous methanol, distilling the solvent under diminished pressure, and drying the residue at 70° C. and 0.1 mm. for two hours. A solution of 6 parts by weight of cis-3-dimethylamino-2,2,4,4-tetramethyl-1-cyclobutanol and 9 parts by weight of ethyl benzilate in 700 parts by volume of dry n-heptane is added to the dry sodium methoxide. The solution is allowed to reflux for twenty hours, while 450 parts by volume of distillate is separated with a Dean-Stark trap.

The residue is diluted with 150 parts by volume of ether and the organic solution is washed with water to neutrality and then extracted with dilute hydrochloric acid. The acid extract is made basic and the organic base is extracted with ether. Concentration of the ether layer after drying over magnesium sulfate gives 13 parts by weight of crude product (viscous oil).

After recrystallization of crude product from petroleum ether, 2.9 parts by weight of cis-3-dimethylamino-2,2,4,4-tetramethyl-1-cyclobutyl benzilate; melting point 152–155° C., is obtained.

Example XVIII

To a solution of 2 parts by weight of cis-3-amino-2,2,4,4-tetramethyl-1-cyclobutanol and 3.1 parts by weight of sodium acetate in 50 parts by volume of 95% methanol is added with cooling a solution of 1.5 parts by weight of cyanogen bromide in 20 parts by volume of methanol. The resulting solution is allowed to stand at 0° C. for ninety minutes and the solvent is distilled under diminished pressure. The residue is dissolved in 50 parts by volume of distilled water, is made strongly basic with 30% sodium hydroxide solution, and is allowed to stand at room temperature for seventy-two hours. The resulting white solid is filtered and recrystallized from benzene and ethanol to give 1.5 parts by weight of cis-3-hydroxy-2,2,4,4-tetramethyl-1-cyclobutylurea, melting point 180–183° C.

Example XIX

A solution of 3.3 parts by weight of trans-3-hydroxy-2,2,4,4-tetramethyl-1-cylobutylamine hydrochloride in 50 parts by volume of distilled water is carefully made basic with sodium hydroxide solution and the free amine is extracted with ether. To a solution of the free trans-aminoalcohol and 3.1 parts by weight of sodium acetate in 50 parts by volume of 95% methanol is added with cooling a solution of 2.0 parts by weight of cyanogen bromide in 30 parts by volume of methanol. The resulting solution is allowed to stand at 0° C. overnight.

The solvent is distilled under diminished pressure. A 25 parts by volume portion of water is added to the residue; the resulting white solid is filtered and recrystallized from benzene to give 2.2 parts by weight of trans-3-hydroxy-2,2,4,4-tetramethyl-1-cyclobutylcyanamide, melting point 175–178° C.

Example XX

A solution of 7.8 parts by weight of cis-3-hydroxy-2,2,4,4-tetramethyl-1-cyclobutylcyanamide in 80 parts by volume of anhydrous tetrahydrofuran is cooled in an ice bath. An excess amount of hydrogen chloride is dissolved in the solution and the resulting reaction mixture is allowed to stand at room temperature. The precipitated product is filtered and dried to give 7.5 parts by weight of cis-N-(3-hydroxy-2,2,4,4-tetramethyl-1-cyclobutyl)-chloroformamidine hydrochloride, melting point 162–164° C. (sealed capillary tube).

Example XXI

A solution of 0.8 part by weight of trans-3-hydroxy-2,2,4,4-tetramethyl-1-cyclobutylcyanamide in 10 parts by volume of anhydrous tetrahydrofuran is cooled in an ice bath. An excess amount of hydrogen chloride is dissolved in the solution and the resulting reaction mixture is allowed to stand at room temperature. The precipitated product is filtered and dried to give 0.83 part by weight of trans-N-(3-hydroxy-2,2,4,4-tetramethyl-1-cyclobutyl)-chloroformamidine hydrochloride, melting point 167–170° C. (sealed capillary tube).

What is claimed is:

1. A member selected from the group consisting of 1-phenyl-1-hydroxy-3-di-(lower alkyl)-amino-2,2,4,4-tetramethylcyclobutane and a chemical compound having the formula:

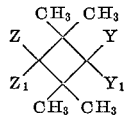

wherein Z is a member selected from the group consisting of hydroxy, diphenylacetoxy, benziloyloxy and benzenesulfonamido; Y is a member selected from the group consisting of di-(lower alkyl)-amino, benzenesulfonamido, cyanamido, ureido and chloroformamido, provided that when said Y is di-(lower alkyl)-amino Z is other than hydroxy; $Z_1$ and $Y_1$ are each hydrogen; and Z and $Z_1$ taken together represent oxo in which case Y is p-tolylsulfonyloxy.

2. 3-hydroxy-2,2,4,4-tetramethylcyclobutanone-p-toluenesulfonate.

3. 1,3-dibenzenesulfonamido-2,2,4,4-tetramethylcyclobutane.

4. 3-dimethylamino-2,2,4,4-tetramethyl-1-cyclobutyldiphenylacetate.

5. 3-hydroxy-2,2,4,4-tetramethyl-1-cyclobutylcyanamide.

6. 3-dimethylamino-2,2,4,4-tetramethyl-1-phenyl-1-cyclobutanol.

7. 3-dimethylamino-2,2,4,4-tetramethyl-1-cyclobutyl benzilate.

8. 3-hydroxy-2,2,4,4-tetramethyl-1-cyclobutylurea.

9. N-(3-hydroxy-2,2,4,4-tetramethyl-1-cyclobutyl)-chloroformamidine.

References Cited by the Examiner

UNITED STATES PATENTS

| | | | |
|---|---|---|---|
| 2,936,324 | 5/1960 | Hasek et al. | 260—617 |
| 3,017,395 | 1/1962 | Elam et al. | 260—563 X |
| 3,051,622 | 8/1962 | Kuna et al. | 260—563 X |
| 3,125,569 | 3/1964 | Martin et al. | 260—563 |
| 3,189,608 | 6/1965 | Martin | 260—563 X |

OTHER REFERENCES

Burger et al.: J. Med. Pharm. Chem., vol. 2, pp. 687–691 (1960).

Hasek et al.: J. Org. Chem., vol. 26, pp. 4775–4776 (1961).

CHARLES B. PARKER, *Primary Examiner.*

LEON ZITVER, *Examiner.*

S. H. LIEBERSTEIN, F. D. HIGEL, *Assistant Examiners.*